May 24, 1949.    G. MALCOM    2,470,937
ELECTRIC MOTOR PRE-SET CONTROL
Filed May 22, 1946    2 Sheets-Sheet 1
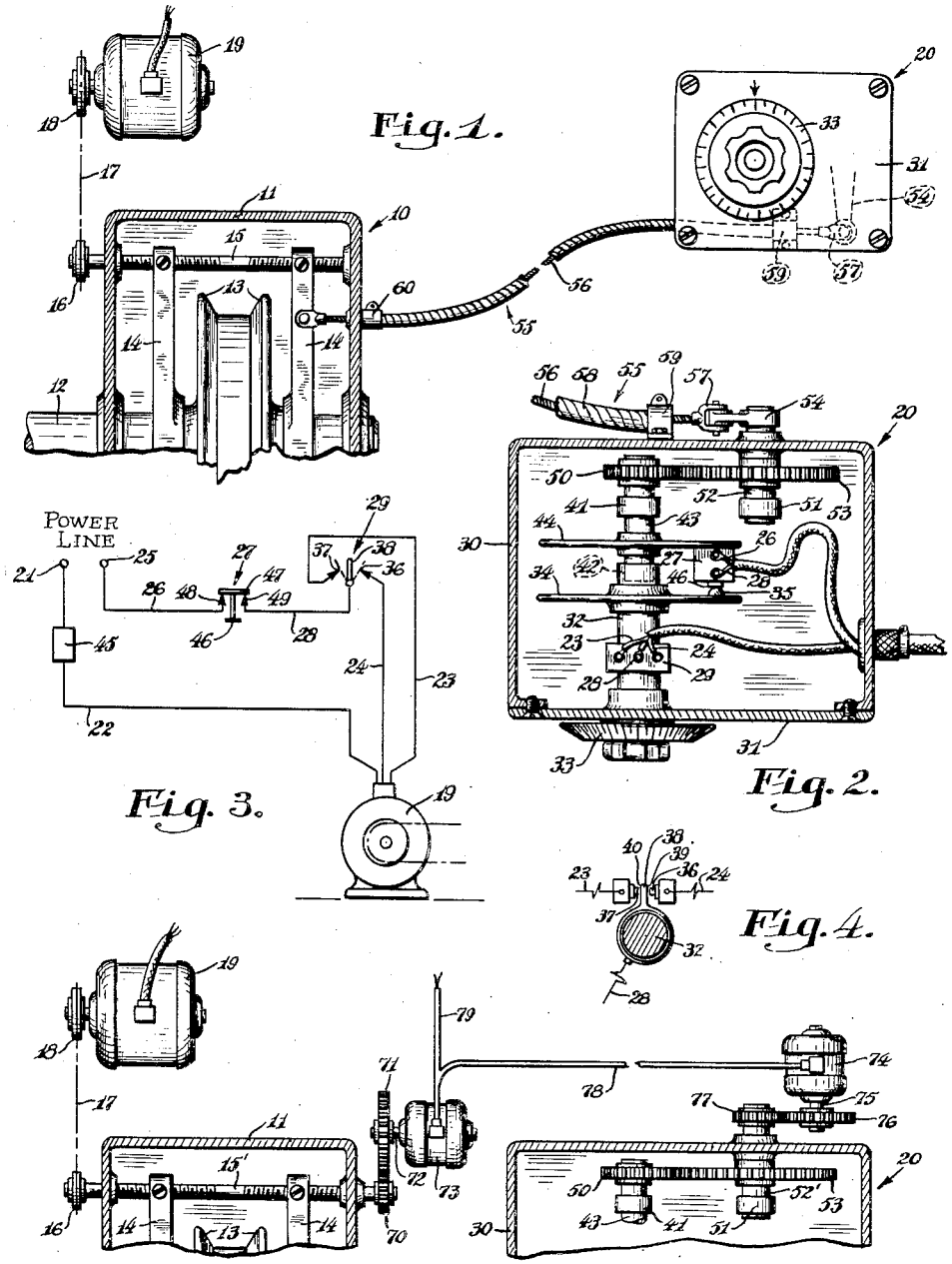
INVENTOR.
GLEN MALCOM,
BY: Harold B. Hood.
ATTORNEY.

May 24, 1949.　　　　　G. MALCOM　　　　　2,470,937
ELECTRIC MOTOR PRE-SET CONTROL
Filed May 22, 1946　　　　　　　　　　　　　2 Sheets-Sheet 2

INVENTOR.
GLEN MALCOM,
BY: Harold B. Hood.
ATTORNEY.

Patented May 24, 1949

2,470,937

UNITED STATES PATENT OFFICE 2,470,937

ELECTRIC MOTOR PRESET CONTROL

Glen Malcom, Columbus, Ind., assignor to Reeves Pulley Company, Columbus, Ind., a corporation of Indiana Application May 22, 1946, Serial No. 671,619

15 Claims. (Cl. 318—31)

The object of the present invention is to provide a device for accurately positioning a member in response to instant adjustment of a control member, which may be remotely located with respect to the member to be positioned. While the invention is disclosed and described in connection with a speed varying transmission of the well known "Reeves" type, it will be obvious that it is applicable to use in connection with other members to be accurately positioned.

It is customary to control the ratio of input speed to output speed in a "Reeves" transmission through the medium of a reversible electric motor connected to drive a screw shaft which, in turn, will shift control elements operatively connected to mating coned pulley sections. In standard practice, a push button, or other form of switch, is manually actuated to energize the forward winding or the reverse winding of the electric motor to drive the screw shaft in one direction or the other, and the switch is manually held closed until the speed ratio of the transmission reaches the desired value, whereupon the switch is manually opened. Some time is required for the motor to shift the transmission parts to the desired positions, and the operator must stand at the control point during that time, every time he wants to change the transmission speed ratio.

It is the primary object of the present invention to provide a control of such character that the operator may shift a control member instantaneously to any position within its range, and then abandon the control member, whereupon the mechanism of the present invention will automatically bring the controlled element to the position which corresponds to the selected setting of the control member, and then deenergize the motor automatically, leaving the control mechanism in such a condition that any subsequent manipulation of the control member will be effective to bring the shifting cycle into operation again.

A further object of the invention is to provide in a device of the character under consideration, means for protecting a system against improper operation resulting from improper manipulation of the manual control element. A further object of the invention is to provide means whereby, once the control has been set in operation, its operation becomes independent of the manual control element, and remains so until the cycle initiated has been completed. A still further object of the invention is to provide means to insure against the initiation of an improper cycle of operation after power failure.

A further object of the invention is to provide a very simple, inexpensive, rugged and durable mechanism to accomplish the above result. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a fragmental, more or less diagrammatic, illustration of an assembly including a member to be controlled, a pilot motor for shifting said member, and a control box;

Fig. 2 is an enlarged horizontal section through the control box constructed in accordance with my invention;

Fig. 3 is a wiring diagram, illustrating diagrammatically the operation of my control system;

Fig. 4 is a transverse section through one form of selector switch which may be used in my invention;

Fig. 5 is a more or less diagrammatic fragmental view of a modified form of my invention.

Figure 6:
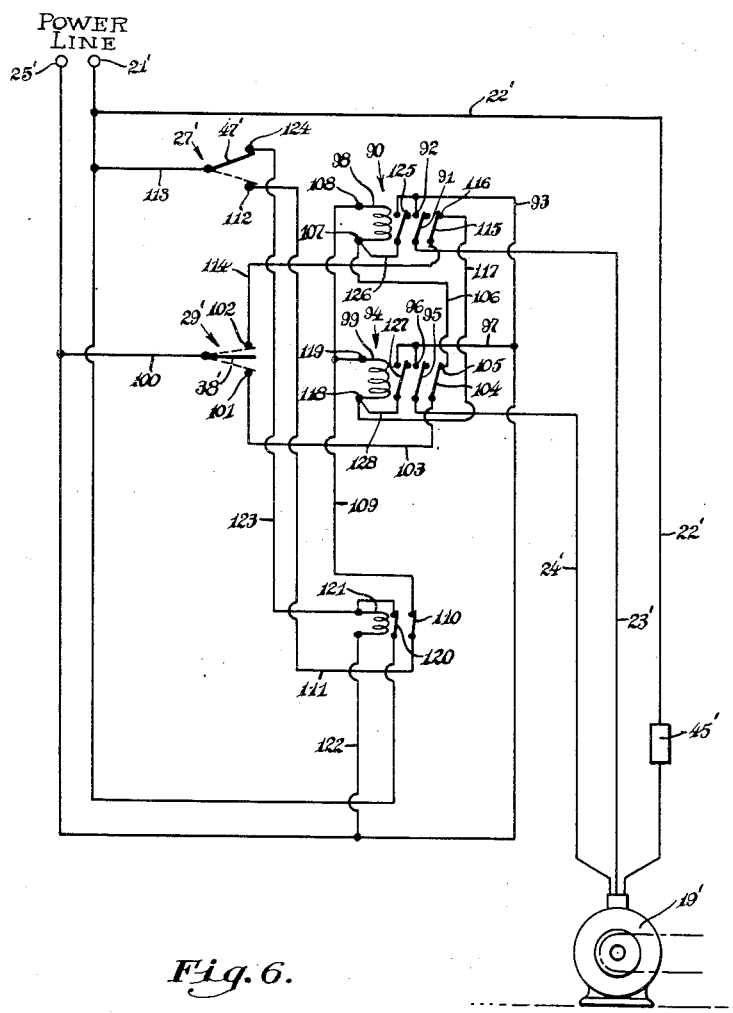
Fig. 6 is a wiring diagram of a preferred and more elaborate control set up to guard against damage resulting from erratic manipulation of the control knob.

Referring more particularly to the drawings, it will be seen that I have illustrated a fragment of a "Reeves" variable speed transmission, indicated generally by the reference numeral 10, and comprising a housing 11 in which is journalled a shaft 12. Relatively axially shiftable mating coned pulley sections 13 are splined on said shaft, and their axial positions are controlled by shifter arms 14, 14, said arms having threaded connections with a screw shaft 15, oppositely threaded near its opposite ends, and journalled in the housing 11. Outboard, said shaft 15 carries a pulley or sprocket 16 connected, by a belt or chain 17, to be driven from a pulley or sprocket 18 mounted on the spindle of a reversible electric motor 19. Thus far, the mechanism described is standard construction.

A control unit, indicated generally by the reference numeral 20, may be mounted adjacent the mechanism thus far described, or at point remote therefrom. The wiring of the control unit 20 is diagrammatically illustrated in Fig. 3. From power line terminal 21, a line 22 leads through a motor overload relay switch 45 to the common terminal of the forward and reverse windings of the motor 19. A line 24 leads from the forward winding of said motor, and a line 23 extends from the reverse winding of said motor.

From the other power line terminal 25, a lead 26 extends, through a control switch, indicated generally by the reference numeral 27, the other side of said switch being connected, by a lead 28, with the common terminal of a selector switch, indicated generally by the reference numeral 29. It will be seen that the switch 27 is connected in the energizing circuits for both windings of the motor 19, and that the switch 29 is alternatively connectible in said two circuits.

The control unit 20 comprises a housing 30 whose open front end may be closed by a cover plate 31. A spindle 32 is journalled in said cover plate, and carries, outside the cover plate, a dial or control knob 33, whereby said spindle may be rotated. Within the housing 30, the spindle 32 carries a disc 34 upon which is formed or fixed an actuating element 35 for the switch 27.

The switch 29 is illustrated in some detail in Fig. 4. The terminal 36 is connected to the forward winding lead 24, and the terminal 37, positioned on the opposite side of a vertical plane including the axis of the spindle 32, is connected to the reverse-winding lead 23. A contactor arm 38 is frictionally supported on the spindle 32 to partake, to a limited extent, of the movements of said spindle, said arm being suitably insulated from the said spindle and being electrically connected to the lead 28. The frictional mounting of the arm 38 on the spindle 32 is such that, so long as rocking movement of said arm is unopposed, it will partake of any movement of the spindle; but when the face 39 of said arm engages the terminal 36, further clockwise movement of the spindle will merely cause said spindle to slip with respect to said arm. If, with the face 39 of the arm 38 in contact with the terminal 36, the spindle 32 is moved in counterclockwise direction, the arm will move with the spindle until its face 40 engages terminal 37, whereafter further counterclockwise movement of the spindle will merely cause the spindle to slip with respect to the arm. It is to be noted that a very slight counterclockwise movement of the spindle 32 will remove the arm face 39 from the terminal 36 and bring the face 40 into contact with the terminal 37 or vice versa.

Journalled in a suitable bearing 41 within the housing 30, and with its end 42 telescopically journalled in a suitable socket in the inner end of spindle 32, is a shaft 43 coaxial with said spindle, and independently rotatable with respect thereto. Said shaft 43 carries the disc 44, upon which is fixed the switch 27.

Said switch 27 includes a plunger 46, secured to a bridge member 47, the unit 46—47 being biased, either by gravity or by a suitable spring or both, to switch-closing position in which the bridge member 47 engages the terminals 48 and 49, respectively connected to the leads 26 and 28. The switch may be opened by upward movement of the plunger 46; and it will be seen, from an inspection of Fig. 2, that the element 35 on the disc 34 and the plunger 46 travel in a common path so that, when said plunger registers with said element 35, the element 35 lifts the plunger to open the circuit at the switch 27. When the registration between the element 35 and the plunger 46 is broken, the switch 27 will be automatically closed.

Fixed to the shaft 43 is a small gear 50. Journalled in a wall of the housing 30 and in a suitable bearing 51 within said housing is a second shaft 52 to which is fixed a larger gear 53 meshing with the gear 50. Outside the housing, said shaft 52 carries a lever 54, adjustably fixed to said shaft. A flexible cable, indicated generally by the reference numeral 55, connects the lever 14 with said lever 54 to drive the shaft 52, and therefore the shaft 43, in response to movements of said lever 14. I have shown the cable 55 as a Bowden wire, whose inner wire 56 carries at one end a shackle 57 pivotally associated with the free end of the lever 54, the other end of said wire being similarly shackled to the lever 14. One end of the sheath 58 of the Bowden wire is anchored, by suitable means 59, to the housing 30 adjacent the lever 54, while the other end of said sheath is anchored, by suitable means 60, to the housing 11.

With the parts in the positions illustrated, an operator may adjust the dial 33, in a clockwise direction, for instance, instantaneously to any degree within its range, and may thereupon abandon the control unit which will automatically assume the burden of shifting the levers 14, 14 to a new position corresponding accurately to the selected position of the dial 33.

A first increment of movement of the dial 33 swings the face 39 of the arm 38 into engagement with the terminal 36, and moves the element 35 out of registration with the plunger 46, which immediately drops into the switch-closing position of Fig. 3. Thereby, an energizing circuit for the forward winding of the motor 19 is established as follows: power line terminal 21, relay 45, common lead 22, motor forward winding, lead 24, terminal 36, arm 38, lead 28, terminal 49, bridge member 47, terminal 48, lead 26, and power line terminal 25. Upon such energization of the motor, the motor spindle will be rotated in a clockwise direction, as viewed from the left of Fig. 1, to drive the screw shaft 15 in the same direction. Thereby, those ends of the levers 14 threadedly associated with the screw shaft are moved away from each other, whereby lever 54 will be swung in a counterclockwise direction, as viewed in Fig. 2. Such movement of the lever 54 will turn the gear 53 in a counterclockwise direction, as viewed from the bottom of Fig. 2, to turn the disc 44, through the multiplying gear, in a clockwise direction to follow the element 35. The motor will continue to operate until the plunger 46 finds the element 35 and is elevated by engagement with said element, to drive the bridge member 47 out of engagement with the terminals 48 and 49, thereby breaking the motor energizing circuit.

It will be seen that the parts are thus left in condition for activation to drive the parts in either direction, by further manipulation of the dial 33. Further clockwise movement of said dial will leave the arm in contact with the terminal 36 but will again break the registration between the element 35 and the plunger 46 to close the forward energizing circuit for the motor 19. Counterclockwise manipulation of the dial 33 will shift the arm 38 out of contact with the terminal 36 and into contact with the terminal 37, at the same time breaking registration between the element 35 and the plunger 46, whereby the reverse winding of the motor 19 will be energized to drive the screw shaft 15 in the opposite direction, thereby causing the illustrated ends of the levers 14, 14 to approach each other and swinging the lever 54 in a clockwise direction to turn the disc 44 in a counterclockwise direction until the plunger 46 again attains registry with the element 35, when the switch 27 will be opened to stop the motor.

It is customary to provide suitable braking means for the motor 19 to prevent coasting, after the energizing circuit is broken, and consequent "hunting" of the control.

In Fig. 5, I have illustrated a modified form of means for causing the disc 44 to follow manipulation of the disc 34 in response to operation of the motor 19. Parts identical to those illustrated in Figs. 1 and 2 are indicated by the same reference numerals. In the form of my invention illustrated in Fig. 5, the screw shaft 15' extends outwardly beyond the housing 11 to support a pinion 70 meshing with a gear 71 fixed on the spindle 72 of one unit 73 of a synchronous repeater motor pair. The other unit 74 of said pair has fixed to its spindle 75 a gear 76 meshing with a gear 77 fixed on the shaft 52' which carries the gear 53. The two units 73 and 74 are electrically connected together through the standard connections 78, and are connected to the power line through the standard connections 79.

Rotation of the screw shaft 15' in either direction by the motor 19 will be transmitted, through the gear pair 70, 71, to the synchronous repeater motor 73; and, as is well understood in the art, the synchronous repeater motor 74 will respond with an equal number of rotations of its spindle 75 in the same direction. The gear is so designed that the disc 44 will thereby be driven to a suitable degree to bring the plunger 46 into registration with the element 35 to deenergize the motor 19 when the levers 14, 14 have reached the position corresponding to the selected position of the dial 33.

The mechanism above described will operate entirely satisfactorily under most circumstances, and so long as the knob 33 is manipulated properly. However, under certain circumstances of erratic and improper manipulation of said knob, considerable damage could be done to the control. For instance, assuming the wiring arrangement illustrated in Fig. 3, it would be possible to turn the knob 33 in a clockwise direction to close the switch 27 and to move the arm 38 into contact with the terminal 36; and then to turn the knob 33 a very short distance in a counterclockwise direction to bring the arm 38 into contact with the arm 27. That would cause the disc 44 to rotate in a counterclockwise direction through almost a complete revolution, before the plunger 46 could find the cam 35; and thereby the control would be thrown out of proper relationship to the transmission 10.

Or, let us assume that, after a 180° shift of the knob 33, in a clockwise direction, and before the switch 27 has attained registry with the cam 35, a power failure should occur. The operator might very possibly shift the knob 33 back and forth through erratic distances, trying to make the control come to life; and might leave the disc 34 out of registery with the disc 44.

In Fig. 6, I have illustrated a wiring system which will guard against improper energization of the control, resulting from improper manipulation of the knob 33. I have indicated power source terminals 21' and 25' corresponding to the terminals 21 and 25, a motor 19' corresponding to the motor 19, leads 22', 23', and 24' corresponding to the leads 22, 23, and 24, a main switch 27' corresponding to the switch 27, and a selector switch 29' corresponding to the switch 29, as well as an overload relay 45' like the relay 45.

The energizing circuit for the forward winding of the motor 19' includes a switch indicated generally by the reference numeral 90, and including a switch arm 91 connected to lead 23' and movable into and out of contact with a terminal 92 connected to a lead 93 which extends to the power source terminal 25'. When the arm 91 is in contact with the terminal 92, the forward winding of the motor will be energized through the circuit 21', 22', forward motor winding, 23', 91, 92, 93, and 25'.

A reverse circuit switch, indicated generally by the reference numeral 94, includes a switch arm 95 connected to the lead 24' and movable into and out of contact with a terminal 96 which is connected to a lead 97 joining the lead 93. When said switch arm 95 is in contact with the terminal 96, a reverse circuit is established from power terminal 21', through 22', motor reverse winding, 24', 95, 96, 97 and 93 to power terminal 25'.

The switch arm 91 is normally in its illustrated position, and is movable into contact with the terminal 92 only by energization of the relay 98. Similarly, the switch arm 95 is normally in its illustrated position and is movable into contact with the terminal 96 only by energization of the relay 99.

A lead 100 connects the switch 29' with the power source terminal 25'; and the arm 38' of said switch is movable alternatively into contact with separated terminals 101 and 102.

From the terminal 101, a lead 103 extends to a switch arm 104 which is a part of the switch 94 and which is normally in contact with a terminal 105 connected, by a lead 106, with one terminal 107 of the relay 98. The other terminal 108 of said relay 98 is connected, by a lead 109, through a safety switch 110 and a lead 111 to a terminal 112 adapted to be contacted by the switch arm 47' of the switch 27', said arm, in turn, being connected by a lead 113 to the power source terminal 21'.

A lead 114 extends from the terminal 102 to a switch arm 115 which is a part of the switch 90, and which is normally in contact with a terminal 116 connected, by a lead 117, to one terminal 118 of the relay 99, the other terminal 119 of which is connected to the lead 109.

The safety switch 110 is under control of a relay 121 which also controls a switch 120 connected in the primary energizing circuit 122 of said relay 121. So long as said relay 121 is energized, the switches 110 and 120 are closed; but deenergization of said relay 121 results in opening both of said switches 110 and 120.

A secondary energizing circuit for the said relay 121 extends from the power terminal 21' through lead 113, switch arm 47', upper terminal 124, which is contacted by said arm 47' when the cam 35 is in registry with the plunger 46, lead 123, relay 121, and lead 122 to power terminal 25'.

A further switch arm 125 is controlled by the relay 98. When said relay is energized, the arm 125 completes a holding circuit for said relay 98 which extends from power terminal 21', lead 113, switch arm 47', terminal 112, lead 111, switch 110, relay 98, wire 126, and switch arm 125 to the lead 93 and power terminal 25'. A similar switch arm 127 is included in the switch 94, and is adapted to close a similar circuit through the relay 99, and wire 128, when said relay 99 is energized.

Thus, it will be seen that the energizing circuits for the respective windings of the motor 19' are directly under control of the switch arms 91 and 95 of the switches 90 and 94, respectively; that those switch arms can be moved to circuit-closing positions only by energization of their respective relays; that the energizing circuit for each such relay includes a switch arm which can stand in circuit-closing position only when the other relay is deenergized; that the energizing circuits for both of said relays are dependent upon non-registry of the cam 35 with the plunger 46; that energization of said relays is selectively dependent upon manipulation of the selector switch 29' but that, once energized, each relay establishes a holding circuit for itself independent of the selector switch; and that the energizing circuits for both relays are dependent upon the safety switch 110 which can be closed only when the relay 121 is energized.

It follows that if, for instance, the control knob 33 is manipulated to move the switch arm 38' into contact with the terminal 101, the relay 98 will be energized through a circuit which includes the switch arm 104 of the switch 94; and that thereupon the forward winding of the motor 19' will be energized, a holding circuit for the relay 98, independent of the switch arm 38', will be established through the switch arm 125, and that the switch arm 115 will be moved out of engagement with the terminal 116. If, now, the operator should shift the switch arm 38' into contact with the terminal 102, no circuit would thereby be closed until after the switch arm 47' is lifted out of contact with the terminal 112, and then returned to contact with said terminal. Thus, reversal of the motor 19' can not be effected until after the follower disc 44 has regained registry with the pilot disc 32.

It will further be seen that a power failure, resulting from any cause, will open the switch 110, whereby the arms of switches 90 and 94 will drop into their illustrated positions. If, now, with the switch arm 47' in contact with the terminal 112 and the switch arm 38' in contact with the terminal 101, the power source should again be energized, nothing will happen in the illustrated control, whether or not the operator has, in the meantime, erratically manipulated the control knob. Neither of the relays 98 and 99 can be energized except through closure of the switch 110. That switch can not be closed except by energization of the relay 121. There are provided only two possible circuits for energization of that relay, one of which must run through the switch 120, and the other of which must run through the terminal 124 of the switch 28. With the switches 110 and 120 open, therefore, the control can be brought back into operative condition only by manipulation of the control knob to bring the cam 35 into registry with the plunger 46 to lift the switch arm 47' into contact with the terminal 124.

By that manipulation, the relay 121 will be energized to close the switches 110 and 120, whereafter the control may be manipulated in normal fashion.

I claim as my invention:

1. In a mechanism for positioning a load accurately in response to manipulation of a control member, a reversible electric motor connected to shift said load, forward and reverse circuits for alternatively energizing said motor, a switch dominating both said circuits, a selector switch connected to activate either of said circuits alternatively, an oppositely shiftable control member, operatively connected to said selector switch to activate one of said circuits upon movement in one direction and to activate the other of said circuits upon movement in the other direction, other means operatively connected to said control member and actuated, by movement of said control member in either direction, to close said first-named switch, whereby said motor is energized, and further means driven by said motor independently of said control member to follow said other means to open said first-named switch after movement of said last-named means to a degree determined by the degree of movement of said other means.

2. In a mechanism for positioning a load accurately in response to manipulation of a control member, a reversible electric motor connected to shift said load, forward and reverse circuits for alternatively energizing said motor, a switch dominating both said circuits, a selector switch connected to activate either of said circuits alternatively and including an arm movable in one direction to activate one of said circuits and in an opposite direction to activate the other of said circuits, a control member operatively connected to said arm to move the same alternatively in opposite directions, a carriage, said first-named switch being mounted on said carriage for movement therewith, an element movable by said control member into and out of cooperative relation with said first-mentioned switch, said element being effective, when in cooperative relation with said first-mentioned switch, to open the same, and means connecting said motor to drive said carriage, upon energization of said motor, to move said first-named switch into cooperative relation with said element.

3. In a device of the class described, a part to be oppositely shifted, a reversible electric motor operatively connected to shift said part, forward and reverse energizing circuits for said motor, a control unit remote from said motor and element, said unit comprising a spindle element and a coaxially-mounted shaft element independently rotatable relative to said spindle element, indicator means rotatable with said spindle element, a switch movable with said one of said elements, said switch being biased to closed position and dominating both of said motor energizing circuits, a member movable with the other of said elements along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle element and being movable wtih said spindle element into engagement with said terminals alternatively, and means operatively connecting said motor to drive said shaft element to reestablish registration between said member and said switch.

4. In a device of the class described, an element to be oppositely shifted, a reversible electric motor operatively connected to shift said element, forward and reverse energizing circuits for said motor, a control unit comprising a spindle, indicator means rotatable with said spindle, a shaft coaxial with said spindle and rotatable independently of said spindle, a switch movable with said shaft, said switch being biased to closed position and dominating both of said motor energizing circuits, a member movable with said spindle along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle and being movable with said spindle into engagement with said terminals alternatively, and means operatively connecting said motor to drive said shaft to cause said switch to follow said member into registration therewith.

5. In a device of the class described, an element to be oppositely shifted, a reversible electric motor operatively connected to shift said element, forward and reverse energizing circuits for said motor, a control unit comprising a spindle, indicator means rotatable with said spindle, a shaft coaxial with said spindle and rotatable independently of said spindle, a switch movable with said shaft, said switch being biased to closed position and dominating both of said motor energizing circuits, a member movable with said spindle along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle and being movable with said spindle into engagement with said terminals alternatively, and means operatively connecting said element to drive said shaft to cause said switch to follow said member into registration therewith.

6. In a device of the class described, a part to be oppositely shifted, a reversible electric motor operatively connected to shift said part, forward and reverse energizing circuits for said motor, a control unit comprising a spindle element and a coaxially-mounted shaft element independently rotatable relative to said spindle element, indicator means rotatable with said spindle element, a switch movable with one of said elements, said switch being biased to closed position and dominating both of said motor energizing circuits, a member movable with the other of said elements along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle element and being movable with said spindle element into engagement with said terminals alternatively, a lever oscillatably mounted adjacent said shaft element and operatively connected to rotate said shaft element, and a flexible cable connecting said shiftable part to oscillate said lever to drive said shaft element to reestablish registration between said member and said switch 7. In a device of the class described, an element to be oppositely shifted, a reversible electric motor operatively connected to shift said element, forward and reverse energizing circuits for said motor, a control unit comprising a spindle, indicator means rotatable with said spindle, a shaft coaxial with said spindle and rotatable independently of said spindle, a switch movable with said shaft, said switch being biased to closed position and dominating both of said motor energizing circuits, a member movable with said spindle along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle and being movable with said spindle into engagement with said terminals alternatively, a lever oscillatably mounted adjacent said shaft, a multiplying gearing operatively connecting said lever with said shaft, and a flexible cable connecting said element to oscillate said lever to drive said shaft to cause said switch to follow said member into registration therewith.

8. In a device of the class described, an element to be oppositely shifted, a reversible electric motor operatively connected to shift said element, forward and reverse energizing circuits for said motor, a control unit comprising a spindle, indicator means rotatable with said spindle, a shaft coaxial with said spindle and rotatable independently of said spindle, a switch movable with said shaft, said switch being biased to closed position and dominating both of said motor energizing circuits, a member movable with said spindle along a path adjacent the path of said switch and operable, when in cooperative registration with said switch, to open said switch, a selector switch comprising a terminal connected in one of said circuits, a terminal connected in the other of said circuits and a contactor connected in both said circuits, said contactor being frictionally associated with said spindle and being movable with said spindle into engagement with said terminals alternatively, a second shaft paraxial with said first-named shaft, a lever fixed to said shaft, a flexible cable operatively connecting said element to oscillate said lever, a gear fixed on said shaft, and a gear of smaller pitch diameter fixed on said first-named shaft.

9. In a device of the class described, a part to be oppositely shifted, a reversible electric motor operatively connected to shift said part, forward and reverse energizing circuits for said motor, a control unit comprising a spindle element and a coaxially-mounted shaft element independently rotatable relative to said spindle element, indicator means rotatable with said said spindle element, a switch movable with one of said elements, said switch being biased to closed position and dominating both of said motor energizing circuits, a member movable with the other of said elements along a path adjacent the path of said switch and operable, when in cooperative registration with said switch, to open said switch, a selector switch comprising a terminal connected in one of said circuits, a terminal connected in the other of said circuits, and a contactor connected in both said circuits, said contactor being frictionally associated with said spindle element and being movable with said spindle element into engagement with said terminals alternatively, a synchronous repeater motor pair, means connecting said motor to drive one element of said pair, and means connecting the other element of said pair to drive said shaft.

10. In the device of claim 1, means independent of said selector switch for maintaining either of said circuits, once energized, regardless of subsequent manipulation of said selector switch.

11. In the device of claim 1, means independent of said selector switch for preventing energization of either of said circuits, after power failure, when said first-named switch is closed.

12. Control mechanism for a reversible electric motor, comprising forward and reverse circuits for alternatively energizing said motor, a normally open switch in each of said circuits, relay means for each of said switches, each operable to close its associated switch upon energization, an energizing circuit for each of said relay means, a normally closed switch in each of said relay-energizing circuits connected to be opened upon closure of the other of said energizing circuits, a main switch connected in both of said relay-energizing circuits, a selector switch movable oppositely to enter, alternatively, said respective relay-energizing circuits, a normally open holding circuit for each of said relay means, each excluding said selector switch and closed upon energization of its included relay means, means for moving said selector switch in either direction and for concurrently closing said main switch, and means driven by said motor to follow said last-named means to open said main switch.

13. The combination with a reversible electric motor having a forward winding and a reverse winding, of a forward energizing circuit and a reverse energizing circuit for said respective windings, of a normally open switch in said forward energizing circuit, a forward relay, an energizing circuit for said forward relay, a normally closed switch in said forward relay energizing circuit, a holding circuit for said forward relay, a normally open switch in said forward relay holding circuit, a normally open switch in said reverse energizing circuit, a reverse relay, an energizing circuit for said reverse relay, a normally closed switch in said reverse relay energizing circuit, a holding circuit for said reverse relay, a normally open switch in said reverse relay holding circuit, said forward relay being operable, upon energization, to close said forward energizing circuit switch and said forward relay holding circuit switch and to open said reverse relay energizing circuit switch, and said reverse relay being operable, upon energization, to close said reverse energizing circuit switch and said reverse relay holding circuit switch and to open said forward relay energizing circuit switch, a selector switch operable alternatively to connect either of said relay energizing circuits with one side of said power source, and a main switch connected between the other side of said power source and all of said relay circuits.

14. Control mechanism for a reversible electric motor having a forward winding and a reverse winding, comprising an energizing circuit for said forward winding including a normally open switch, a forward relay operable upon energization, to close said switch, an energizing circuit for said reverse winding including a second normally open switch, a reverse relay operable, upon energization, to close said second switch, a circuit for energizing said relays alternatively, said relays being connected therein in parallel through a selector switch, a safety switch in series with said selector switch and both of said relays, a safety relay operable, when energized, to hold said safety switch closed, and a main switch in series with said selector switch and both of said first-named relays, a primary energizing circuit for said safety relay, a switch in said primary energizing circuit, said switch being closable only by energization of said safety relay, and a secondary energizing circuit for said safety relay dominated by said main switch, said main switch including a contact element movable between a contact in said energizing circuits for said forward and reverse relays and a contact in said secondary energizing circuit for said safety relay.

15. The combination of claim 13 in which a safety switch is connected in series between said forward and reverse relays and said main switch, and including a safety relay, said safety switch being open at all times except when said safety relay is energized, a primary energizing circuit for said safety relay, a switch in said primary energizing circuit closable only by energization of said safety relay, and a secondary energizing circuit for said safety relay dominated by said main switch, said main switch including a contact element movable between a contact in said energizing circuits for said forward and reverse relays and a contact in said secondary energizing circuit for said safety relay.

GLEN MALCOM.

REFERENCES CITED

The following references are of record in the file of this patent:

UNITED STATES PATENTS

| Number | Name | Date |
|---|---|---|
| 1,122,942 | Kaminski | Dec. 29, 1914 |
| 2,210,426 | Noack | Aug. 6, 1940 |
| 2,228,199 | Chance | Jan. 7, 1941 |
| 2,355,381 | Lear | Aug. 8, 1944 |
| 2,413,902 | Allen | Jan. 7, 1947 |